(12) United States Patent
Mao (10) Patent No.: US 11,077,866 B2
(45) Date of Patent: Aug. 3, 2021

(54) INTELLIGENT DRIVING CONTROL

(71) Applicant: SHANGHAI SENSETIME INTELLIGENT TECHNOLOGY CO., LTD., Shanghai (CN)

(72) Inventor: Ningyuan Mao, Shanghai (CN)

(73) Assignee: SHANGHAI SENSETIME INTELLIGENT TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 16/908,151

(22) Filed: Jun. 22, 2020

(65) Prior Publication Data

US 2020/0317218 A1 Oct. 8, 2020

Related U.S. Application Data

(63) Continuation of application No. PCT/CN2019/093647, filed on Jun. 28, 2019.

(30) Foreign Application Priority Data

Jul. 28, 2018 (CN) .......................... 201810850398.6

(51) Int. Cl.
 *B60Q 1/00* (2006.01)
 *B60W 50/16* (2020.01)
 (Continued)

(52) U.S. Cl.
 CPC ............. *B60W 50/16* (2013.01); *B60K 31/18* (2013.01); *B60W 40/105* (2013.01);
 (Continued)

(58) Field of Classification Search
 CPC ................ B60W 50/16; B60W 50/14; B60W 2050/143; B60W 30/09; B60W 40/105;
 (Continued)

(56) References Cited

U.S. PATENT DOCUMENTS 7,362,239 B2 * 4/2008 Franczyk ......... G08G 1/096716
 340/466
8,305,206 B2 * 11/2012 Miller ................. B60W 50/085
 340/441

(Continued)

FOREIGN PATENT DOCUMENTS

CN 101596903 A 12/2009
CN 102452396 A 5/2012

(Continued)

OTHER PUBLICATIONS

State Intellectual Property Office of the People's Republic of China, Office Action and Search Report Issued in Application No. 2018108503986, dated Nov. 21, 2019, 21 pages.

(Continued)

*Primary Examiner* — Toan N Pham (57) ABSTRACT

Embodiments of the present application provide an intelligent driving control method and apparatus, a vehicle, an electronic device, a medium, and product. The method includes: detecting a driving environment of a vehicle, to obtain a detection result of at least one type of target objects in the driving environment; determining whether the detection result meets a preset driving alert condition; in response to the detection result meeting the preset alert condition, determining whether a speed of the vehicle exceeds a speed threshold; and in response to the speed exceeding the speed threshold, triggering a driving alert according to the detection result.

20 Claims, 1 Drawing Sheet

(51) Int. Cl.
    *B60K 31/18*     (2006.01)
    *B60W 40/105*     (2012.01)
    *G06K 9/00*     (2006.01)
    *B60W 50/14*     (2020.01)

(52) U.S. Cl.
    CPC ..... *G06K 9/00798* (2013.01); *G06K 9/00805* (2013.01); *G06K 9/00818* (2013.01); *B60W 2050/143* (2013.01); *B60W 2050/146* (2013.01)

(58) Field of Classification Search
    CPC ................ B60W 40/08; B60W 40/02; B60W 2050/146; G08G 1/048; G08G 1/01; G08G 1/09; B60K 31/18
    See application file for complete search history.

(56) References Cited

U.S. PATENT DOCUMENTS

| | | | |
|---|---|---|---|
| 9,177,470 B2 * | 11/2015 | Hamberger | G08G 1/09623 |
| 2012/0101701 A1 | 4/2012 | Moshchuk et al. | |
| 2015/0161881 A1 | 6/2015 | Takemura et al. | |

FOREIGN PATENT DOCUMENTS

| | | |
|---|---|---|
| CN | 104508722 A | 4/2015 |
| CN | 105172673 A | 12/2015 |
| CN | 205239304 U | 5/2016 |
| CN | 105620477 A | 6/2016 |
| CN | 105818742 A | 8/2016 |
| CN | 106882190 A | 6/2017 |
| CN | 107719368 A | 2/2018 |
| CN | 107891808 A | 4/2018 |
| CN | 108162761 A | 6/2018 |
| CN | 109159667 A | 1/2019 |
| DE | 19901810 A1 | 7/2000 |
| KR | 20180071575 A | 6/2018 |

OTHER PUBLICATIONS

International Search Report for Application No. PCT/CN2019/093647, dated Sep. 11, 2019, WIPO, 4 pages.

Decision of Rejection Issued in Chinese Application No. 2018108503986, dated Mar. 3, 2021, 22 pages.

* cited by examiner

INTELLIGENT DRIVING CONTROL

CROSS REFERENCE TO RELATED APPLICATIONS

The present application is a continuation of International Application No. PCT/CN2019/093647, filed on Jun. 28, 2019, which claims a priority of the Chinese Patent Application No. CN201810850398.6, filed with the Chinese Patent Office on Jul. 28, 2018, and entitled "INTELLIGENT DRIVING CONTROL METHODS AND APPARATUSES, VEHICLES, ELECTRONIC DEVICES, MEDIA, AND PRODUCTS", the disclosure of which is incorporated herein by reference in its entirety.

TECHNICAL FIELD

The present application relates to a vehicle control technology and, in particular, to an intelligent driving control method and apparatus, a vehicle, an electronic device, a medium, and a product.

BACKGROUND

As continuous popularization of vehicles, traffic accidents also increase; more than 20 million people worldwide get injured or disabled in traffic accidents each year, more than 1 million are dead, and economic losses reach 500 billion U.S. dollars. Road safety has greatly threatened lives and properties of the public due to road traffic accidents every year, and becomes a key point which gains global attention. Analysis results on vehicle traffic accidents show that about 80% of the traffic accidents that have happened, were caused by drivers who did not react in time and did not handle the accidents properly.

SUMMARY

Embodiments of the present application provide intelligent driving control technology.

An intelligent driving control method provided according to one aspect of the embodiments of the present application includes:

detecting a driving environment of a vehicle, to obtain a detection result of at least one type of target objects in the driving environment;

determining whether the detection result meets a preset driving alert condition;

determining whether a speed of the vehicle exceeds a speed threshold in response to the detection result meeting the preset driving alert condition; and triggering a driving alert according to the detection result in response to the speed exceeding the speed threshold.

According to another aspect of the present application, an intelligent driving control apparatus is provided, the apparatus including:

an environment detection unit, configured to detect a driving environment of a vehicle, to obtain a detection result of at least one type of target objects in the driving environment;

a condition judgment unit, configured to determine whether the detection result meets a preset driving alert condition;

a speed judgment unit, configured to determine whether a speed of the vehicle exceeds a speed threshold in response to the detection result meeting the preset driving alert condition; and an alert unit, configured to trigger a driving alert according to the detection result in response to the speed exceeding the speed threshold.

According to another aspect of embodiments of the present application, a vehicle is provided, the vehicle including: the intelligent driving control apparatus according to any one of the embodiments above.

According to another aspect of embodiments of the present application, an electronic device is provided, the electronic device including: a processor which includes the intelligent driving control apparatus according to any one of the embodiments above.

Optionally, the electronic device is a vehicle electronic device.

According to another aspect of embodiments of the present application, an electronic device is provided, the electronic device including: a memory for storing executable instructions; and a processor for communicating with the memory to execute the executable instructions so as to complete operations of the intelligent driving control method according to any of the embodiments above.

Optionally, the electronic device is a vehicle electronic device.

According to another aspect of embodiments of the present application, a computer storage medium is provided for storing computer-readable instructions. When the instructions are executed, the intelligent driving control method according to any of the embodiments above is implemented.

According to another aspect of embodiments of the present application, a computer program product including computer-readable codes is provided. When the computer-readable codes are operated on a device, a processor in the device is caused to implement the intelligent driving control method according to any of the embodiments above.

Based on an intelligent driving control method and apparatus, a vehicle, an electronic device, medium, or a product according to embodiments of the present application, a driving environment of a vehicle is detected to obtain a detection result of at least one type of target objects in the driving environment; it is determined whether the detection result meets a preset driving alert condition; in response to the detection result meeting the preset driving alert condition, it is determined whether a speed of the vehicle exceeds a speed threshold; and in response to the speed exceeding the speed threshold, a driving alert is triggered according to the detection result. Therefore, the driving security of the vehicle can be improved. Moreover, since alerts with respect to a low danger level and/or a low emergency level are limited by means of the speed threshold, the driver's normal judgment may not be disturbed due to frequent alerts.

The embodiments of the present disclosure will be described in detail below with reference to the accompanying drawings.

BRIEF DESCRIPTION OF DRAWINGS

The accompanying drawings constituting a part of the specification illustrate some embodiments of the present disclosure and are intended to explain the principles of the present disclosure together with the description.

The present disclosure can be understood well from the following detailed description with reference to the accompanying drawings, in which.

DETAILED DESCRIPTION

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present application.

In addition, it should be understood that, for ease of description, the size of each part shown in the accompanying drawings is not drawn in actual proportion.

The following descriptions of at least one exemplary embodiment are merely illustrative, and not intended to limit the present disclosure and the applications or uses thereof.

Technologies, methods and devices known to persons of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for using together with the computer system/server include, but are not limited to, Personal Computer (PC) systems, server computer systems, thin clients, thick clients, handheld or laptop devices, microprocessor-based systems, set-top boxes, programmable consumer electronics, network PCs, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like for performing specific tasks or implementing specific abstract data types. The computer systems/servers may be implemented in the distributed cloud computing environments in which tasks are executed by remote processing devices that are linked via a communication network. In the distributed computing environments, the program modules may be located in local or remote computing system storage media including storage devices.

Figure 1:
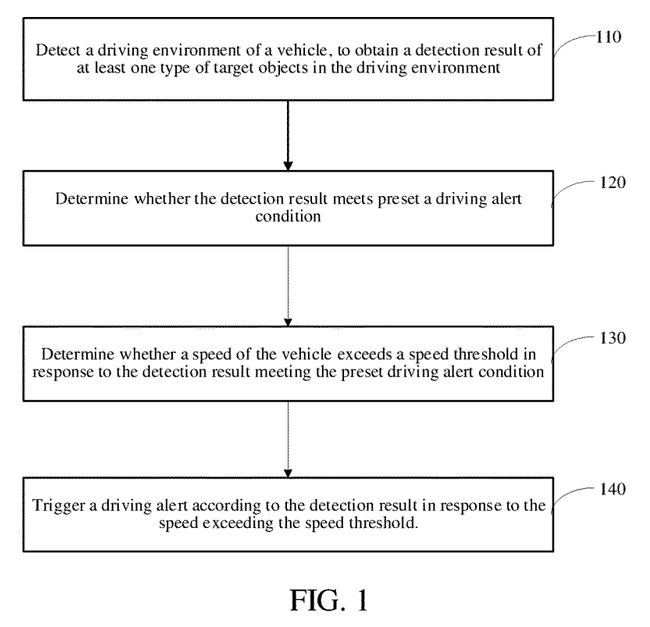
FIG. 1 is a flowchart of an intelligent driving method according to some embodiments of the present application.

FIG. 1 is a flow chart of an intelligent driving method according to embodiments of the present application. As shown in FIG. 1, the method of this embodiment may include Steps 110~140.

At step 110, a driving environment of a vehicle is detected to obtain a detection result of at least one type of target objects in the driving environment.

Optionally, during the driving process of the vehicle, the driving environment of the vehicle is obtained by acquiring images around the vehicle by at least one image acquisition apparatus (for example, a camera, etc.) disposed around the vehicle; the driving environment includes multiple types of target objects that can be observed around the vehicle. To ensure the continuity of the environment detection, continuous multiple image frames around the vehicle can be acquired by the image acquisition apparatus, for example, the driving environment of the vehicle is detected by acquiring a video, where the continuous multiple image frames may refer to each image frame in a temporal continuous video or may also refer to multiple image frames having the target object obtained after target object detection; at this time, two continuous image frames may be discontinuous in time.

Figure 2:
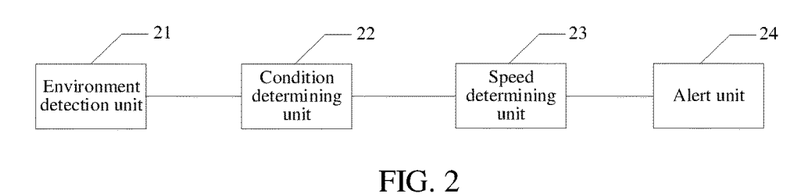
FIG. 2 is a schematic block diagram of an intelligent driving apparatus according to some embodiments of the present application.

In an optional example, step S110 may be executed by invoking, by a processor, corresponding instructions stored in a memory, and may also be executed by an environment detection unit 21 run by the processor.

At step 120, whether the detection result meets a preset driving alert condition is determined.

The preset driving alert condition is set for triggering the driving alert. Different preset driving alert conditions may be set for different conditions and/or corresponding to different driving environments; for example, different preset driving alert conditions may be set for a new driver and a skilled driver to adapt to different requirements of different drivers, so as to provide personalized services for different drivers while improving the security, thereby improving user experiences.

In an optional example, step S120 may be executed by invoking, by a processor, corresponding instructions stored in a memory, and may also be executed by a condition determining unit 22 run by the processor.

At step 130, in response to the detection result meeting the preset driving alert condition, whether a speed of the vehicle exceeds a speed threshold is determined.

During the driving process of the vehicle, a driver has different reaction times under different speeds; when the speed is low (not exceeding the speed threshold), it can be considered that the driver has enough reaction time to handle the alert condition that has occurred; at this time, the alert may be or may not be triggered. In this embodiment, the alert is not triggered, therefore reducing interferences on the driver due to frequent alerts which affect the normal judgment and handling of the driver.

In an optional example, step S130 may be executed by invoking, by a processor, corresponding instructions stored in a memory, and may also be executed by a speed determining unit 23 run by the processor.

At step 140, in response to the speed exceeding the speed threshold, a driving alert is triggered according to the detection result.

In an optional example, step S140 may be executed by invoking, by a processor, corresponding instructions stored in a memory, and may also be executed by an alert unit 24 run by the processor.

Based on embodiments of the present application, an intelligent driving control method is provided, including: detecting a driving environment of a vehicle, to obtain a detection result of at least one type of target objects in the driving environment; determining whether the detection result meets a preset driving alert condition; determining whether a speed of the vehicle exceeds a speed threshold in response to the detection result meeting the preset driving alert condition; and triggering a driving alert according to the detection result in response to the speed exceeding the speed threshold. Therefore it improves the driving security of the vehicle and meanwhile prevents interfering the normal judgment of a driver due to frequent alerts by limiting the number of alert times for a low danger level and/or a low emergency level by means of speed thresholds.

In one or more optional embodiments, the speed threshold is defaulted or the speed threshold is set according to the received instruction.

Optionally, a user may set a greater or smaller threshold according to his/her own driving requirements or behavior habits, thereby increasing universality of this embodiment and improving the user experience. If the user does not desire to determine alert triggering according to the speed, the speed threshold may be set as 0, for example, for an application scene of forward collision early alert to other objects such as pedestrians and motor vehicles, the speed threshold may be set as 0, i.e. triggering the driving alert as long as the preset driving alert condition is met without determining the speed.

In one or more optional embodiments, among the at least one type of target objects:

speed thresholds corresponding to different types of the target objects are the same or different; and/or, preset driving alert conditions corresponding to different types of the target objects are the same or different; and/or, driving alert modes corresponding to different types of the target objects are the same or different.

In this embodiment, the speed threshold, the preset driving alert condition, and a mode of the driving alert are set according to actual conditions; during the setting, since the requirements of specific drivers are different, the speed thresholds respectively corresponding to different types of target objects are set to be the same or different; for example, the speed threshold corresponding to the lane line is set to be 60 km per hour, while the speed threshold for motor vehicles is set to be 200 km per hour; the present application does not define the specific value of the speed threshold; similarly, the preset driving alert conditions and driving alert modes respectively corresponding to different types of target objects can be the same or different; the present application does not limit the specific driving alert mode and preset driving alert condition.

Optionally, the mode of driving alert includes, but not limited to, at least one of the following modes: an auditory alert mode, a visual alert mode, a tactile alert mode, or an olfactory alert mode.

The driving alert is set for prompting the driver to notice the current driving environment; to draw the driver's attention, one or more modes are selected to stimulate the driver, for example, by an auditory alert mode (e.g., making an alert sound); at this time, an alert volume is set according to specific conditions; however, in a noisy environment, sounds are hard to be distinguished, other one or more alert modes are adopted; for example, the visual alert mode (e.g., displaying an alert image at a corresponding position of the vehicle, etc.), and/or the tactile alert mode (e.g., drawing the driver's attention by means of bumps on a steering wheel or a seat), and/or the olfactory alert mode (e.g., drawing the driver's attention by releasing safe gas with a pungent smell); the present application does not limit which specific driving alert mode is adopted.

In one or more optional embodiments, the at least one type of the target objects include, but not limited to, lane lines, traffic signs, traffic lights, pedestrians, motor vehicles, non-motor vehicles, animals, dangerous objects, and fixed obstacles. The target objects can appear separately or collectively; during detection, multiple types of target objects can be detected using different detection techniques respectively or detected simultaneously based on an image source such as video images; when multiple types of target objects are detected at the same time, the preset driving alert conditions of the target objects can be concurrently determined.

In one or more optional embodiments, the detection result in the driving environment includes a combination of one or more of: a detection result of departure from a lane line, a traffic sign detection result, a traffic light state detection result, and a detection result of a distance from an other object.

The other object includes at least one of: a pedestrian, a motor vehicle, a non-motor vehicle, an animal, a dangerous object, or a fixed obstacle.

When the vehicle is driven on the road, the driving environment includes multiple moving or stational target objects around the vehicle. Traffic rules are required to be followed to ensure driving safety, thus the traffic signs, and/or traffic lights, and/or lane lines need to be detected to reduce the cases of traffic violations and reduce the danger produced when other objects around the vehicle are trying to avoid a collision.

Optionally, when the detection result in the driving environment includes a detection result of multiple types of target objects that respectively correspond to at least two different speed thresholds, a less one of the at least two different speed thresholds is taken as the speed threshold corresponding to a current driving environment.

When the speed of the vehicle is low, inertia and impact brought about are small, and the reaction time provided for the driver can be correspondingly extended. Therefore, to ensure driving safety, when multiple types of target objects appear at the same time, it is required to ensure that the detection result for the target object which is more dangerous (for example, the most dangerous target object) can be alerted in time. Therefore, the speed threshold is required to be limited as a small speed threshold.

In one or more optional embodiments, the method of this embodiment further includes:

in response to the triggering of the driving alert, obtaining a driving state of the vehicle during a preset time period; and in response to that after the preset time period expires, the driving state of the vehicle does not match a default driving state corresponding to the detection result, generating a driving control instruction for the vehicle according to the default driving state corresponding to the detection result.

The embodiments of the present application provide assisted driving control in which the vehicle is mainly controlled by the driver. After the driving alert is triggered, a period of time can be reserved for the driver to adopt a measure. If the driver still does not adjust the driving state after a reasonable period of time of alerting, it means the danger level has increased significantly, and the assisted driving mode can be switched to an automatic driving mode to take over the control of the vehicle, so as to automatically control the vehicle to adopt a safe measure.

In one or more optional embodiments, the method provided in this embodiment further includes:

in response to the triggering of the driving alert, obtaining a variation trend of the detection result over a preset time period; and in response to that the variation trend of the detection result indicates that a danger level being kept or rising and that duration of the alert exceeds a preset threshold, generating a driving control instruction for the vehicle according to a default driving state corresponding to the detection result After the driving alert is triggered, first a reasonable reaction time (a preset time period) is provided for the driver for determining by himself. During this period of time, the driver may determine to change the driving state or turn off the alert (the alert can be turned off manually after the problem is solved), but when the driver does not adopt any measure while the variation trend of the detection result indicates that the danger level is continuously increasing, i.e., the danger level of the detection result increases as the time passes, and the vehicle needs to be automatically controlled to ensure driving safety.

In one or more optional embodiments, when the target object is a lane line, step 110 may include:

acquiring a video stream involving a drive road based on an image acquisition apparatus disposed on the vehicle;

detecting a lane line from at least one image frame of the video stream to obtain a detection result of the lane line; and obtaining a detection result of departure from the lane line based on the detection result of the lane line and a relative position of the vehicle.

Since the lane line is disposed on a road surface, when acquiring the video stream, the video stream including the driving road needs to be acquired. Optionally, detection on the lane line in the image is performed by a deep neural network, for example, identifying the lane line in the image by an image identifying network to obtain the position of the lane line in the image; determining a relative position information between the vehicle and the lane line according to the positions of the lane lines in multiple continuous image frames; the relative position information may include, but not limited to: on the line, departure to the left, departure to the right, centering, etc.; in the embodiments of the present application, violations of the vehicle such as running on the line may be reduced by obtaining the lane line departure detection result.

Optionally, step 130 may include:

in response to the detection result of departure from a lane line meeting the preset driving alert condition, determining whether the speed of the vehicle exceeds a first speed threshold.

In this embodiment, a first speed threshold is set for the detection result of departure from a lane line. When the speed of the vehicle exceeds the first speed threshold, the driving alert can be triggered to prompt the driver to notice the condition of departure from the lane line so as to reduce violations of the vehicle.

Optionally, the preset driving alert condition includes that a distance between the vehicle and the lane line reaching a preset range.

Optionally, the distance between the vehicle and the lane line can be set according to the setting of traffic rules or set according to actual conditions. When the relative position information of the vehicle and the lane line does not conform to the setting of traffic rules, it is identified as departure from the lane line, which herein refers to a wheel falling with a certain range of a distance from the lane line, for example, [−k, k], then it is considered that the preset driving alert condition is met, and by means of alerts, the times for the vehicle violating the traffic rules are reduced.

Optionally, the first speed threshold is greater than 35 km per hour.

When the detection result of the lane line meets the preset driving alert condition, if the speed is low, the driver can handle the varied condition by himself, so as to reduce frequent prompts which interfere the accurate operations by the driver or cause antagonizing of the driver. If the speed is greater than a preset value (35 km per hour in this embodiment), it is indicated that a violation and/or danger would occur if the driver does not adjust in time. At this time, an alert needs to be triggered to reduce the occurrence of the violation and/or danger and improve the driving safety.

Optionally, the first speed threshold is in a range of 60~80 km per hour.

To set a more proper speed threshold, upon multiple experiments, setting the first speed threshold to be in a range of 60~80 km per hour conforms to operation habits and reaction time for most people, which can lower the probability of the occurrence of the violation and/or danger while reducing the frequent prompts.

Optionally, the obtaining the variation trend of the detection result over the preset time period in response to the triggering of the driving alert includes:

in response to the triggering of the driving alert, obtaining a variation trend of departure of the vehicle from the lane line over the preset time period;

the generating of the driving control instruction for the vehicle according to the default driving state corresponding to the detection result includes:

in response to that the variation trend of the departure of the vehicle from the lane line indicates a level of the departure from the lane line rising and that the duration of the alert exceeds the preset threshold, issuing a prompt information for turning on a turn signal light and/or controlling the vehicle to turn on a corresponding turn signal light according to a default driving state corresponding to the detection result of departure from a lane line.

In the embodiments of the present application, when the variation trend of the detection result of departure from a lane line indicates that the vehicle needs to be automatically controlled when the lane line departure level increases while the duration of the alert exceeds the set threshold, to reduce the occurrence of dangerous conditions when the driver cannot handle in time. For example, when the vehicle keeps departure towards the left of the lane line, and the driver fails to adjust the direction after a preset alert time, which indicates that the vehicle is about to turn left, the vehicle can be controlled to turn on the left turn signal light to avoid collision with a rear vehicle.

Optionally, if the alert signal is not responded in time, it is handled safely under two conditions. Optionally, one condition includes: in response to the variation trend of the lane line departure detection result indicating that the lane line departure degree increases and the duration of the alert exceeds the preset threshold, giving a prompt information for turning on the turn signal light and/or controlling the vehicle to turn on the corresponding turn signal light according to the default driving state corresponding to the detection result of departure from a lane line includes:

in response to that the variation trend of the departure of the vehicle from the lane line indicates a level of the departure from the lane line rising and that the duration of the alert exceeds the preset threshold, determining, based on at least one of the traffic sign detection result, the traffic signal light state detection result, or the detection result of the distance from an other object, to issue the prompt information for turning on the turn signal light and/or to control the vehicle to turn on the corresponding turn signal light.

At this time, it is indicated that the vehicle keeps departure towards a same direction, which means it is turning, thus a prompt for turning on the turn signal light can be issued or the turn signal light can be automatically controlled to be turned on to ensure that other vehicles can identify the driving trace of the vehicle and reduce the probability of the occurrence of the danger.

The other condition may include: in response to the triggering of the driving alert, obtaining a variation trend of the detection result over the preset time period, which includes: in response to the triggering of the driving alert, obtaining a variation range of a distance between the vehicle and the lane line;

the generating of the driving control instruction for the vehicle according to the default driving state corresponding to the detection result in response to that the variation trend of the detection result indicates that the danger level being kept or rising and the duration of the alert exceeds the preset threshold includes:

in response to that the variation range exceeds a safe distance range during a time period corresponding to the preset threshold for the duration of the alert, controlling the vehicle so that the distance between the vehicle and the lane line is kept within the safe distance range.

At this time, it is indicated that driving is in an unstable state, during the adjustment process by the driver, it keeps departing to the left or to the right, which increases the danger. The distance between the vehicle and the lane line is automatically controlled to be in a stable and safe distance range to ensure the driving safety.

Optionally, the obtaining of the driving state of the vehicle during the preset time period in response to the triggering of the driving alert includes:

in response to the triggering of the driving alert, obtaining a turn signal light state of the vehicle;

the generating of the driving control instruction for the vehicle according to the default driving state corresponding to the detection result in response to that after the preset time period expires, the turn signal light state does not match the default driving state corresponding to the detection result includes:

in response to that, after the preset time period expires, the turn signal light state matches the default driving state corresponding to the detection result, not issuing the prompt information and/or the control information and/or in response to that, after the preset time period expires, the turn signal light state does not match the default driving state corresponding to the detection result, issuing the prompt information and/or the control information.

When the relative position information of the vehicle and the lane line is identified and it is determined that the vehicle needs to turn, the state information of the turn signal light of the vehicle is obtained. If the lane line detection result indicates that the vehicle is turning or starts to turn and the vehicle has not turned on or incorrectly turned on the turn signal light, the prompt information and/or control information is generated, so that the vehicle turns on the turn signal light corresponding to the detection result, so as to reduce the probability of collision with the rear vehicle.

Optionally, when the vehicle needs to turn, in addition to the information of the lane line, a state of the current traffic light and/or a type of the traffic sign are also needed to be observed. If the currently required turn contradicts with the state of the traffic light and/or the type of the traffic sign, the turn is rejected and the vehicle is adjusted back to a normal route. Only in a case that both the state of the traffic light and the type of the traffic sign are conformed, the prompt information for turning on the turn signal light is generated and/or the vehicle is controlled to turn on the corresponding turn signal light.

Optionally, the default driving state corresponding to the detection result is determined based on the relative position information and the type of the lane line; the type of the lane line includes at least one of: white dotted lines, white solid lines, yellow dotted lines, yellow solid lines, double white dotted lines, double yellow solid lines, yellow dotted and solid lines, or double white solid lines.

Optionally, the type of the lane line includes, but not limited to: white dotted lines, white solid lines, yellow dotted lines, yellow solid lines, double white dotted lines, double yellow solid lines, yellow dotted and solid lines, double white solid lines, etc.; different lane line types correspond to different guide modes, wherein when the white dotted lines are drawn on a section of a road, they are used for separating traffic flows driving in a same direction or functioned as identification lines for a safe driving distance, and when the white dotted lines are drawn in an intersection, they are used for guiding the vehicle; when the white solid lines are drawn on a section of a road, they are used for separating motor and non-motor vehicles driving in a same direction or indicating edges of traffic lanes, and when the white solid lines are drawn in an intersection, they are functioned as guide lane lines or stop lines; when the yellow dotted lines are drawn on a section of a road, they are used for separating traffic flows driving in opposite directions, and when the yellow dotted lines are drawn at a road side or on a curb, they are used for forbidding the vehicle from parking for a long time; when the yellow solid lines are drawn on a section of a road, they are used for separating traffic flows driving in opposite directions, and when the yellow solid lines are drawn at a road side or on a curb, they are used for forbidding the vehicle from parking for a long time or temporarily parking at the road side; when the double white dotted lines are drawn in an intersection, they are functioned as deceleration and give-way lines, and when the double white dotted lines are drawn on a section of a road, they are functioned as variable lane lines as the driving direction changes over time; when the double yellow solid lines are drawn on a section of a road, they are used for separating traffic flows driving in opposite directions; when the yellow dotted and solid lines are drawn on a section of a road, they are used for separating traffic flows driving in opposite directions; on a side of the yellow solid lines, overtaking, crossing, or turning around of the vehicle are forbidden, and on the other side of the yellow dotted lines, overtaking, crossing, or turning around of the vehicle are allowed with an ensured safety condition; when the double white solid lines are drawn in an intersection, they are functioned as stop and give-way lines.

In one or more optional embodiments, when the target objects are other objects, step 110 may include:

acquiring a video stream involving an other object based on an image acquisition apparatus disposed on the vehicle;

detecting the other object from at least one image frame of the video stream to obtain a detection result of the object; and obtaining a detection result of a distance from the other object based on the detection result of the other objects and a relative position of the vehicle.

During the driving process of the vehicle on the road, at least one of other objects would be encountered (for example, pedestrians, motor vehicles, non-motor vehicles, animals, dangerous objects, fixed obstacles, etc.). To achieve safe driving and reduce occurrence of accidents such as rear-ended accidents, this embodiment further includes: identifying other objects by the image acquisition apparatus, determining the distance information between the vehicle and the other objects, and according to the distance information, performing the intelligent driving control on the vehicle, thereby effectively reducing the occurrence of collision and rear-ended accidents, and improving safety of the road traffic.

Optionally, step 130 may include:

in response to the detection result of the distance from the other object meeting the preset driving alert condition, determining whether the speed of the vehicle exceeds a second speed threshold.

In the embodiments of the present application, a second speed threshold is set for the detection result of the distance from the other object; when the diving speed of the vehicle exceeds the second speed threshold, the driving alert can be triggered to prompt the driver to notice the distance condition with other objects, so as to reduce the occurrence of the collision and rear-ended accident.

Optionally, for different types of the objects, the second speed thresholds has different value ranges or a same value range.

Since moving speeds of different types of the other objects are different, for example, the moving speeds of pedestrians are slow, the moving speeds of other motor vehicles are fast, while the fixed obstacles are immobile, therefore the relative speeds between different other objects and the vehicle are different, and the time for collision at a same distance is also different; hence, setting different second speed thresholds for different types of the other objects can reduce the probability of collision for all different types of the other objects.

Optionally, when the other objects are motor vehicles, the value range of the second speed threshold is in a range of 20~200 km per hour.

Since the speed of a motor vehicle is fast, at this time, the speed of the vehicle is too fast to react for controlling the vehicle in time, the speed of the motor vehicle is limited between 20-200 km per hour, to ensure an emergency situation can be handled in the reaction time so as to reduce the occurrence of accidents and to increase safety.

Optionally, when the other objects are pedestrians, the value range of the second speed threshold is in a range of 20~40 km per hour.

The moving speed of a pedestrian is normally slow; to reduce the danger for the pedestrians, when a pedestrians is identified, the speed is generally required to be lower, and therefore, in this embodiment, when the other objects are pedestrians, the speed is limited in a low range to ensure the safety of the pedestrians.

Optionally, the default driving state corresponding to the detection result of the other object is determined based on time-to-collision of the vehicle with respect to the other objects; and the time-to-collision is determined based on the distance information and relative speed information between the vehicle and the other objects.

Since the vehicle is in a driving state, only by determining the distance between the vehicle and the obstacle cannot determine whether collision would occur; in this embodiment, the time-to-collision is determined by determining the relative speed between the vehicle and the obstacle; when the time-to-collision is smaller than a preset time, a collision may occur, and an alert may be triggered and/or the vehicle may be automatically controlled; in this embodiment, the relative speed between the vehicle and the obstacle is calculated based on the distance variation between the obstacle and the vehicle in continuous image frames in the video stream and the current speed of the vehicle; the distance between the current vehicle and the obstacle is divided by the relative speed so as to obtain the time-to-collision.

Optionally, the obtaining of the variation trend of the detection result over the preset time period in response to the triggering of the driving alert includes:

in response to the triggering of the driving alert, determining whether the time-to-collision meets, within the preset time period, at least one of following conditions: the time-to-collision is less than a first preset time, the time-to-collision is less than a second preset time, or the time-to-collision is less than a third preset time; and the generating of the driving control instruction of the vehicle according to the default driving state corresponding to the detection result in response to that the variation trend of the detection result indicates the danger level increases and the duration of the alert exceeds the preset threshold includes:

generating a preset anti-collision instruction according to the default driving state corresponding to the detection result in response to that the variation trend of the detection result of the other object indicates that the time-to-collision reducing and the duration of the alert exceeds the preset threshold; the preset anti-collision instruction comprising at least one of: an instruction for prompting a driver to reduce the speed, an instruction for controlling the vehicle to reduce the speed, and an instruction for controlling a part or all of braking and/or turning functions of the vehicle.

The values of the first preset time, the second preset time, and the third preset time can be set according to specific reaction time and conditions; in optional embodiments, the number of the preset times can also be properly increased or reduced; for example, only the first preset time is set or the first preset time and the second preset time are set, and also a fourth preset time can be set, etc. so that the intelligent driving control can still be implemented; this embodiment does not limit the time value of a specific preset time and the number of the preset times which are subjected to implement the safe and intelligent control.

Optionally, the generating of the preset anti-collision instruction according to the default driving state corresponding to the detection result in response to that the variation trend of the detection result of the other objects indicates that the time-to-collision reducing and the duration of the alert exceeds the preset threshold, includes:

in response to the time-to-collision being less than the first preset time and the duration of the alert exceeding the preset threshold, issuing alert information to prompt the driver to reduce the speed and/or to turn; and/or in response to the time-to-collision being less than the second preset time and the duration of the alert exceeding the preset threshold, issuing alert information to prompt the driver to reduce the speed and/or to turn and controlling a part of braking and/or turning functions of the vehicle; and/or, in response to the time-to-collision being less than the third preset time and the duration of the alert exceeding the set threshold, controlling the vehicle to brake and/or to turn.

Different operations can be adopted within different preset times, for example, when the time-to-collision is long (less than the first preset time), the alert is issued to prompt the driver to voluntarily control the vehicle; as the time passes, when the time-to-collision is shortened to be less than the second preset time, some of the functions of the vehicle can be controlled while alerting; when the time-to-collision is shortened so that manually control cannot be implemented (less than the third preset time), the vehicle can be automatically controlled to brake and/or turn.

Optionally, respective value ranges of the first preset time, the second preset time, and the third preset time have an intersection therebetween or have no intersection therebetween.

To ensure flexibility of control, the value ranges of the first preset time, the second preset time, and the third preset time can have an intersection or not have an intersection. When the intersection exists, for example, a time-to-collision of 2 seconds is in the intersection between the first preset time and the second preset time; when the time-to-collision is 2 seconds, the operation corresponding to the first preset time can be adopted or the operation corresponding to the second preset time can also be adopted, so that control is more convenient.

Optionally, the first preset time is in a range of 1.5~5 seconds, and/or the second preset time is in a range of 1~2 seconds, and/or the third preset time is less than or equal to 1 second.

When the other objects are vehicles, during normal driving process, the front vehicles are detected in real time. According to the vehicle information, under the condition that the speed is less than 200 km/h, a forward collision early alert function is enabled; after the target vehicle is detected, a relative distance between the target vehicle and the vehicle itself is output and the relative time-to-collision between the vehicle itself and the target vehicle is calculated; for example, an alert collision danger can be promoted at most 2.7 s (the first preset time) in advance to prompt the driver to slow down; if the alert signal is not handled in time, and the vehicle is moving closer to the front vehicle, when the relative collision is reduced to be less than 1.5 s (the second preset time), the assisted driving would upgrade the alert and execute a brake control function (snubbing); furthermore, if still no timely response from the driver and the relative time-to-collision is reduced to be less than 1 s (the third preset time), the assisted driving system would automatically take over the vehicle control system to brake the vehicle to stop in time (emergency brake).

When the other objects are pedestrians, during normal driving process, the pedestrians are detected in real time. According to the vehicle information, under the condition that the speed is less than 40 km/h, a pedestrian collision early alert function is enabled; after the target pedestrian is detected, a relative distance between the target pedestrian and the vehicle itself is output and the relative time-to-collision between the vehicle itself and the target pedestrian is calculated; an alert collision danger can be promoted at most 2.7 s (the first preset time) in advance (the first preset time) to prompt the driver to slow down; if the alert signal is not processed in time, and the vehicle continuously approach the pedestrian, and if the relative collision is reduced to be within 1.5 s (the second preset time), at this time, the assisted driving would upgrade the alert and execute a brake control function (snubbing); furthermore, if no response in time from the driver and the relative time-to-collision is reduced to be within 1 s (the third preset time), at this time, the assisted driving system would automatically take over the vehicle control system to brake the vehicle to stop in time (emergency brake).

In one or more optional embodiments, when the target object is a traffic sign, step 110 may include:

acquiring a video stream involving the traffic sign based on an image acquisition device disposed on the vehicle; classifying the traffic signs in the at least one image frame of the video stream to obtain a classification result of the traffic sign; and obtaining a detection result of the traffic sign according to the classification result of the traffic sign.

During the driving process, the vehicle would encounter various traffic signs, and different traffic signs have different meanings; a traffic sign must be obeyed while driving the vehicle. Therefore, in this embodiment, acquiring the video stream including the traffic sign by the image acquisition apparatus; identifying images in the video stream to obtain the type of the traffic sign; the driving operation that currently can be executed by the vehicle is determined according to the type of the traffic sign, so as to further improve safety of the intelligent driving.

Optionally, step 130 may include:

Determining whether the speed of the vehicle exceeds a third speed threshold in response to the detection result of the traffic sign meeting the preset driving alert condition, In this embodiment, a third speed threshold is set for the traffic sign detection result; when the speed of the vehicle exceeds the third speed threshold, the driving alert can be triggered to prompt the driver to notice the type of the traffic sign so as to reduce violation operations of the vehicle.

A traffic sign must be obeyed while driving the vehicle; traffic signs, as a part of the traffic rules, are disposed on fixed positions; when the traffic sign can be observed by the vehicle, the state of the vehicle needs to be adjusted in time to obey the traffic sign. The embodiment of the present application improves driving safety by using the intelligent driving assistance to prompt the driver and/or to automatically control to reduce incorrect operations due to the driver not observing the traffic sign. For example, when the vehicle does not obey the prohibitory sign, prompting the driver of a serious violation, and requiring further safety actions.

Optionally, the value range of the third speed threshold is greater than 60 km per hour.

Generally the traffic sign can be acquired at a long distance, and if the third speed threshold is set too small, frequent alerts will interfere with the driver, which may cause the driver's repugnance and affect the normal driving. Therefore, in the embodiment of the present application, the third speed threshold is set to be greater than 60 km/h, which can reduce the occurrence of violation operations of the vehicle without frequent alerts.

Generally, since the traffic sign is set relatively in advance, and the image acquisition apparatus could find the traffic sign faster than human eyes, after the traffic sign is found, the driver can be prompt first, and then a reaction time (the preset time) can exist; if no feedback operation is received in the preset time, automatic control can be performed to ensure the driving safety of the vehicle. For example, if the speed of the vehicle exceeds the specified value of a speed limit, corresponding alert information would be issued, so that the driver is promoted with an overspeed state; after lasting a period of time of t s (the value of t can be set according to conditions), the driver still does not adjust the corresponding speed, the system enables a speed limit control function.

Optionally, the generating of the driving control instruction for the vehicle according to the default driving state corresponding to the detection result in response to that after the preset time expires, the driving state of the vehicle does not match a default driving state corresponding to the detection result, includes at least one of the following operations:

in response to that the traffic sign is a speed limit sign and that the driving state of the vehicle does not match the default driving state corresponding to the speed limit sign, generating an instruction for controlling the speed of the vehicle to increase or decrease to a speed corresponding to the traffic sign;

in response to that the traffic sign is a prohibition sign and that a the driving state of the vehicle does not match the default driving state corresponding to the prohibition sign, generating an instruction for controlling the vehicle not to perform an operation prohibited by the traffic sign;

in response to that the traffic sign is a warning sign and that the driving state of the vehicle does not match the default driving state corresponding to the warning sign, generating an instruction for controlling the vehicle to change the driving state;

in response to that the traffic sign is an indication sign and the driving state of the vehicle does not match the default driving state corresponding to the indication sign, generating an instruction for controlling the vehicle to perform driving control according to an indication of the traffic sign;

in response to that the traffic sign is a road sign and/or a tourist region sign and the driving state of the vehicle does not match the default driving state corresponding to the road sign and/or the tourist region sign, generating an instruction for controlling the vehicle to drive towards a corresponding road according to the vehicle's destination; or in response to that the traffic sign is road construction safety sign and the driving state of the vehicle does not match the default driving state corresponding to the road construction safety sign, generating an instruction for controlling the vehicle to perform one or more operations of slowing down, braking, detouring, retaining the driving state, turning, turning on a turn signal light, or turning on a brake light according to the indication of the traffic sign.

Different vehicle controls can be performed for different types of traffic signs, for example, during normal driving, the road traffic sign is detected in real time, including various common speed limits, such as 5, 15, 20, 30, 40, 50, 60, 70, 80, etc.; at this time, the speed of the vehicle is controlled to be reduced to the speed limited by the traffic sign, which respectively corresponds to the speed limits of less than 5 km/h, 15 km/h, 20 km/h, 30 km/h, 40 km/h, 50 km/h, 60 km/h, 70 km/h, and 80 km/h; and a prohibitory sign, for example, no left turn, no right turn, no turn around, no turn, no parking, etc., at this time, the vehicle is controlled not to execute the operation prohibited by the traffic sign, and if the driver executes the prohibited operations, alert information can be issued and/or the operation can be automatically prohibited.

In one or more optional embodiments, when the target object is a traffic light, step may 110 include:

acquiring a video stream involving the traffic light based on an image acquisition apparatus disposed on the vehicle;

performing traffic light state detection on at least one image frame of the video stream, to obtain the traffic light state detection result.

Optionally, the traffic light state may include, but not limited to: distinguishing the traffic lights according to the color and/or shape, for example, the traffic lights distinguished by color include, red light, green light, and yellow light, and the traffic lights distinguished by shape include shapes of going straight, turning left, turning right, turning around. To comprehensively perform intelligent control of the vehicle, in addition to the relative position between the lane line and the vehicle, the states of the traffic lights can also be obtained; according to the state of the traffic light, the vehicle is intelligently controlled to further improve the safety performance of the vehicle.

Optionally, step 130 may include:

in response to the traffic light state detection result meeting the preset driving alert condition, determining whether the speed of the vehicle exceeds a fourth speed threshold.

In this embodiment, a fourth speed threshold is set for the traffic light state detection result; when the speed of the vehicle exceeds the fourth speed threshold, the driving alert can be triggered to prompt the driver to notice the traffic light state so as to reduce violation operations of the vehicle.

Optionally, the preset driving alert condition includes that a current driving state of the vehicle does not conform to the traffic light state detection result.

According to the current traffic regulations, the colors of the traffic lights include red, green, and yellow, with different colors corresponding to different traffic conditions. Red represents prohibiting vehicles and/or pedestrians to pass through; green represents allowing vehicles and/or pedestrians to pass through; and yellow represents vehicles and/or pedestrians need to wait; moreover, what aids the colors may also include the shapes of the traffic signals, etc., for example, a plus shape (an optional first preset shape) represents allowing to pass through, a cross shape (an optionally second preset shape) represents prohibiting to pass through, and a minus shape (an optional third preset shape) represents a waiting state, etc. Different response strategies are provided for different traffic light states, to implement automatic, semi-automatic intelligent driving, and improve driving safety.

Optionally, the value range of the fourth speed threshold is greater than 40 km per hour.

Generally the traffic sign can be acquired at a long distance, and if the fourth speed threshold is set too small, frequent alerts will interfere with the driver, which may cause the driver's repugnance and affect the normal driving. Therefore, in the embodiment of the present application, the value range of the fourth speed threshold is set to be greater than 40 km/h, which can reduce the occurrence of violation operations of the vehicle without frequent alerts.

Optionally, the generating of the driving control instruction of the vehicle according to the default driving state corresponding to the detection result in response to that after the preset time period expires, the driving state of the vehicle does not match the default driving state corresponding to the traffic light state detection result, includes:

in response to that after the preset time period expires, the driving state of the vehicle does not match the default driving state corresponding to the traffic light state detection result, generating an instruction for controlling the vehicle to turn on a turn signal light, slow down, brake, and/or turn.

In a case that upon the duration of the alert exceeding the preset time, the driver still does not adopt a corresponding operation, the vehicle can be controlled according to the default driving state corresponding to the current state of the traffic light, for example, when the color of the traffic light is green and the shape thereof is an arrow pointing left, the vehicle can be controlled to automatically turn (left) and/or automatically turn on the turn signal light (the left turn signal light); when the color of the traffic light is green and the shape thereof is an arrow pointing front, the vehicle can be controlled to slow down to pass through the intersection; certainly, specific controls of driving the vehicle is a result of a combination of the destination set by the current vehicle and the state of the current traffic light. By automatically controlling the vehicle to execute the operation corresponding to the traffic light, intelligent driving with higher safety may be implemented and potential safety dangers caused by manual operational faults may be reduced.

Optionally, the colors of the traffic light include three colors, i.e., red, yellow, and green; the shapes thereof include an arrow shape, a round, or other shapes. For the traffic lights in different shapes, if only the positions thereof are identified, the signals may not be accurately identified; therefore, in this embodiment, at least two of the position region, color, and shape are identified, for example, when the position region and color of the traffic light are determined, the position of the traffic light in the image can be determined (corresponding to a direction to the vehicle), the state displayed by the traffic light can be determined by its color (red, green, or yellow corresponds to different shapes respectively); assisted driving or automatic driving can be implemented by identifying different states of the traffic light; when determining the position region and shape of the traffic light, the position of the current traffic light in the image can be determined (corresponding to a direction to the vehicle); the state displayed by the traffic light can be determined by its shape (for example, different directions of an arrow represent different states, or different shapes of a human graph represent different states); when the color and shape of the traffic light are determined, based on a combination of the color and shape, the state of the current traffic light can be determined (for example, the green arrow pointing left represents turning left and passing, and the red arrow pointing front represents no traffic ahead); moreover, when the position region, color and shape of the traffic light are determined, based on which position the traffic light is in the image is obtained, the state of the current traffic light can further be determined based on a combination of the color and the shape. In this embodiment, by combining two or more of the three attributes may emphasize the characteristics of the attributes of the traffic light, facilitate to improving the performance of detection, identification, etc.

Those in the art with ordinary skills may understand: all or part of the steps of the method embodiments above may be completed by means of hardware program-related program instructions; the preceding programs may be stored in a computer readable storage medium; when the programs are executed, perform the steps of the method embodiments above; moreover, the preceding storage medium includes: various media that may store program codes, such as ROM, RAM, magnetic disks, or light disks.

FIG. 2 is a schematic structural diagram of an intelligent driving apparatus according to the embodiments of the present application. The apparatus of this embodiment is used for implementing each method embodiment of the present application. As shown in FIG. 2, the apparatus in this embodiment includes:

an environment detection unit 21, configured to detect a driving environment of a vehicle, to obtain a detection result of at least one type of target objects in the driving environment;

a condition determining unit 22, configured to determine whether the detection result meets a preset driving alert condition;

a speed determining unit 23, configured to determine, in response to the detection result meeting the preset driving alert condition, whether a speed of the vehicle exceeds a speed threshold; and an alert unit 24, configured to trigger a driving alert according to the detection result in response to the speed exceeding the speed threshold.

The intelligent driving control apparatus provided in the embodiments of the present application improves the safety of the vehicle driving, and at the same time, by means of the speed threshold, the times of alert for low danger level and/or low emergency level are limited, and normal judgment of the driver would not be interfered due to frequent alerts.

In one or more optional embodiments, the speed threshold is defaulted or the speed threshold is set according to the received instruction.

Optionally, a user may set a greater or smaller threshold according to his/her own driving requirements or behavior habits, thereby increasing universality of this embodiment and improving the user experience. If the user does not desire to determine alert triggering according to the speed, the speed threshold may be set as 0, for example, for an application scene of forward collision early alert to other objects such as pedestrians and motor vehicles, the speed threshold may be set as 0, i.e. triggering the driving alert as long as the preset driving alert condition is met without determining the speed.

In one or more optional embodiments, among the least one type of target objects:

speed thresholds corresponding to different types of the target objects are the same or different; and/or, preset driving alert conditions corresponding to different types of the target objects are the same or different; and/or, driving alert modes corresponding to different types of the target objects are the same or different.

In this embodiment, the speed threshold, the preset driving alert condition, and a mode of driving alert are set according to actual conditions; during the setting, since the requirements of specific drivers are different, the speed thresholds corresponding to different types of target objects are set to be the same or different; for example, the speed threshold corresponding to the lane line is set to be 60 km per hour, while the speed threshold for the motor vehicles is set to be 200 km per hour; the present application does not define the specific numeral value of the speed threshold; similarly, the preset driving alert conditions and driving alert modes corresponding to different types of target objects can be the same or different; the present application does not limit the specific driving alert mode and preset driving alert condition.

In one or more optional embodiments, the at least one type of the target objects include at least one of: lane lines, traffic signs, traffic lights, pedestrians, motor vehicles, non-motor vehicles, animals, dangerous objects, or fixed obstacles.

The target objects can be appear separately or collectively; during detection, multiple types of target objects can be detected using different detection techniques respectively or detected simultaneously based on an image source such as video images; when multiple types of target objects are detected at the same time, the preset driving alert conditions of the target objects can be concurrently determined.

Optionally, the mode of driving alert includes, but not limited to, at least one of the following modes: an auditory alert mode, a visual alert mode, a tactile alert mode, or an olfactory alert mode detection result in the driving environment In one or more optional embodiments, the detection result in the driving environment includes a combination of one or more of: a detection result of departure from a lane line, a traffic sign detection result, a traffic light state detection result, and a detection result of a distance from an other object. The other object comprises at least one of: a pedestrian, a motor vehicle, a non-motor vehicle, an animal, a dangerous object or a fixed obstacle.

Optionally, when the detection result in the driving environment includes a detection result of multiple types of target objects that respectively correspond to at least two different speed thresholds, a less one of the at least two different speed thresholds is taken as the speed threshold corresponding to a current driving environment When the speed of the vehicle is low, inertia and impact brought about are small, and the reaction time provided for the driver can be correspondingly extended. Therefore, in order to ensure driving safety, when multiple types of target objects appear at the same time, it is required to ensure that the detection result for the target object which is more dangerous (for example, the most dangerous target object) can be alerted in time. Therefore, the speed threshold is required to be limited as a small speed threshold.

In one or more optional embodiments, the apparatus of this embodiment further includes:

a driving state obtaining unit, configured to, in response to the triggering of the driving alert, obtain a driving state of the vehicle during a preset time period; and a result control unit, configured to, in response to that after the preset time expires, the driving state of the vehicle does not match a default driving state corresponding to the detection result, generate a driving control instruction for the vehicle according to the default driving state corresponding to the detection result.

The embodiments of the present application provide assisted driving control in which the vehicle is mainly controlled by the driver. After the driving alert is triggered, a period of time can be reserved for the driver to adopt a measure. If the driver still does not adjust the driving state after a reasonable period of time of alerting, it means that the danger level has increased significantly, and the assisted driving mode can be switched into an automatic driving mode to take over the control right of the vehicle, so as to automatically control the vehicle to adopt a safe measure.

In one or more optional embodiments, the apparatus of this embodiment further includes:

a result variation unit, configured to obtain a variation trend of the detection result over the preset time period in response to the triggering of the driving alert; and a danger control unit, configured to generate a driving control instruction of the vehicle according to the default driving state corresponding to the detection result in response to the variation trend of the detection result indicating that a danger level being kept or rising and the duration of the alert exceeds a preset threshold.

After the driving alert is triggered, first a reasonable reaction time (a preset time period) is provided for the driver for determining by himself. During this period of time, the driver may determine to change the driving state or turn off the alert (the alert can be turned off manually after the problem is solved), but when the driver does not adopt any measure while the variation trend of the detection result indicates that the danger level is continuously increasing, i.e., the danger level of the detection result increases as the time passes, and the vehicle needs to be automatically controlled the vehicle to ensure driving safety.

In one or more optional embodiments, when the target object is a lane line, the environment detection unit 21 is configured to acquire a video stream involving a drive road based on an image acquisition apparatus disposed on the vehicle; detect the lane line detection in at least one image frame of the video stream to obtain a detection result of the lane line; and obtain a detection result of departure from a lane line according to a lane line detection result and relative position information of the vehicle Since the lane line is disposed on a road surface, when acquiring the video stream, the video stream including the driving road needs to be acquired. Optionally, detection on the lane line in the image is performed by a deep neural network, for example, identifying the lane line in the image by an image identifying network to obtain the position of the lane line in the image; determining the relative position information between the vehicle and the lane line according to the positions of the lane lines in multiple continuous image frames; the relative position information may include, but not limited to: on the line, departure to the left, departure to the right, centering, etc.; in the embodiments of the present application, violations of the vehicle such as running on the line may be reduced by obtaining the lane line departure detection result.

Optionally, the speed determining unit 23 is configured to determine whether a speed of the vehicle exceeds a first speed threshold in response to the detection result of departure from a lane line meeting the preset driving alert condition.

Optionally, the preset driving alert condition includes that a distance between the vehicle and the lane line reaching a preset range.

Optionally, the value range of the first speed threshold is greater than 35 km per hour.

Optionally, the first speed threshold is between 60-80 km per hour.

Optionally, the result variation unit is configured to obtain the variation trend of a lane line departure condition of the vehicle with respect to the lane line over the preset time in response to the triggering of the driving alert.

The danger control unit is configured to, in response to the variation trend of the detection result of departure from a lane line representing that a lane line departure degree increases and the duration of the alert exceeds the preset threshold, issue a prompt information for turning on a turn signal light and/or control the vehicle to turn on a corresponding turn signal light according to a default driving state corresponding to the detection result of departure from a lane line.

Optionally, the danger control unit is configured to, in response to the variation trend of the detection result of departure from a lane line indicating that the lane line departure degree increases and the duration of the alert exceeds the preset threshold, determine, according to at least one detection result of the traffic sign detection result, the traffic signal light state detection result, and the a detection result of a distance from an other object, to issue the prompt information for turning on the turn signal light and/or to control the vehicle to turn on the corresponding turn signal light.

Optionally, the result variation unit is configured to obtain a variation range of a distance between the vehicle and the lane line in response to the triggering of the driving alert.

The danger control unit is configured to, in response to that the variation range exceeds a safe distance range during a time period corresponding to the preset threshold for the duration of the alert, control the vehicle so that the distance between the vehicle and the lane line is kept within the safe distance range.

Optionally, the driving state obtaining unit is configured to, in response to the triggering of the driving alert, obtain a turn signal light state of the vehicle.

The result control unit is configured to, in response to that, after the preset time period expires, the turn signal light state matches the default driving state corresponding to the detection result, not issue the prompt information and/or the control information; and/or in response to that, after the preset time period expires, the turn signal light state does not match the default driving state corresponding to the detection result, issue the prompt information and/or the control information.

Optionally, the default driving state corresponding to the detection result is determined based on the relative position information and the type of the lane line; the type of the lane line includes, but not limited to: white dotted lines, white solid lines, yellow dotted lines, yellow solid lines, double white dotted lines, double yellow solid lines, yellow dotted and solid lines, or double white solid lines In one or more optional embodiments, when the target object is an other object, the environment detection unit 21 is configured to acquire a video stream involving the other object based on an image acquisition apparatus disposed on the vehicle; detect the other object from at least one image frame of the video stream to obtain a detection result of the other object; and obtain a detection result of a distance from the other object based on the detection result of the other object and a relative position of the vehicle.

During the driving process of the vehicle on the road, at least one of other objects would be encountered (for example, pedestrians, motor vehicles, non-motor vehicles, animals, dangerous objects fixed obstacles, etc.). To achieve safe driving and reduce occurrence of accidents such as rear-ended accidents, this embodiment further includes: identifying other objects by the image acquisition apparatus, determining the distance information between the vehicle and the other objects, and according to the distance information, performing the intelligent driving control on the vehicle, thereby effectively reducing the occurrence of collision and rear-ended accidents, and improving safety of the road traffic.

Optionally, the speed determining unit 23 is configured to determine whether a speed of the vehicle exceeds a second speed threshold in response to the detection result of the distance from the other object meeting the preset driving alert condition.

Optionally, for different types of the other objects, the second speed threshold has different value ranges or a same value range.

Optionally, when the other objects are motor vehicles, the value range of the second speed threshold is in a range of 20~200 km per hour.

Optionally, when the other objects are pedestrians, the value range of the second speed threshold is in a range of 20~40 km per hour.

Optionally, the default driving state corresponding to the detection result of the other object is determined based on a time-to-collision of the vehicle with respect to the other object; and the time-to-collision is determined based on the distance information and relative speed information between the vehicle and the other object.

Optionally, the result variation unit is configured to obtain, in response to the triggering of the driving alert, whether the time-to-collision within the preset time period meets at least one of following conditions: the time-to-collision is less than a first preset time, the time-to-collision is less than a second preset time, or the time-to-collision is less than a third preset time; and the danger control unit is configured to generate a preset anti-collision instruction according to the default driving state corresponding to the detection result in response to that the variation trend of the detection result of the other object indicates the time-to-collision reducing and that the duration of the alert exceeds the preset threshold; the preset anti-collision instruction includes, but not limited to: an instruction for prompting a driver to reduce the speed, an instruction for controlling the vehicle to reduce the speed, and an instruction for controlling a part or all of braking and/or turning functions of the vehicle.

Optionally, the danger control unit is configured to, in response to the time-to-collision being less than the first preset time and the duration of the alert exceeding the set threshold, issue alert information to prompt the driver to reduce the speed and/or to turn; and/or in response to the time-to-collision being less than the second preset time and the duration of the alert exceeding the set threshold, issue the alert information to prompt the driver to reduce the speed and/or turning and controlling a part of braking and/or turning functions of the vehicle; and/or, in response to the time-to-collision being less than the third preset time and the duration of the alert exceeding the set threshold, control the vehicle to brake and/or to turn.

Optionally, respective value ranges of the first preset time, the second preset time, and the third preset time have an intersection therebetween or have no intersection therebetween.

Optionally, the first preset time is in a range of 1.5~5 seconds, and/or the second preset time is in a range of 1~2 seconds, and/or the third preset time is less than or equal to 1 second.

In one or more optional embodiments, when the target object is a traffic sign, the environment detection unit 21 is configured to acquire a video stream involving a traffic sign based on an image acquisition device disposed on the vehicle; classify the traffic signs in at least one image frame of the video stream to obtain a classification result of the traffic sign; and obtain a detection result of the traffic sign according to the classification result of the traffic sign.

During the driving process, the vehicle may encounter various traffic signs, and different traffic signs have different meanings; a traffic sign must be obeyed while driving the vehicle. Therefore, in this embodiment, the video stream including the traffic sign is obtained by the image acquisition apparatus; identity the images in the video stream to obtain the type of the traffic sign; the driving operation that currently can be executed by the vehicle is determined according to the type of the traffic sign, so as to further improve safety of the intelligent driving.

Optionally, the speed determining unit 23 is configured to determine whether the speed of the vehicle exceeds a third speed threshold in response to the detection result of the traffic sign meeting the preset driving alert condition.

Optionally, the value range of the third speed threshold is greater than 60 km per hour.

Optionally, the result control unit is configured to execute at least one of the following operations:

in response to that the traffic sign is a speed limit sign and that the driving state of the vehicle does not match the default driving state corresponding to the speed limit sign, generating an instruction for controlling the speed of the vehicle to increase or decrease to a speed corresponding to the traffic sign;

in response to that the traffic sign is a prohibition sign and that a the driving state of the vehicle does not match the default driving state corresponding to the prohibition sign, generating an instruction for controlling the vehicle not to perform an operation prohibited by the traffic sign;

in response to that the traffic sign is a warning sign and that the driving state of the vehicle does not match the default driving state corresponding to the warning sign, generating an instruction for controlling the vehicle to change the driving state;

in response to that the traffic sign is an indication sign and the driving state of the vehicle does not match the default driving state corresponding to the indication sign, generating an instruction for controlling the vehicle to perform driving control according to an indication of the traffic sign;

in response to that the traffic sign is a road sign and/or a tourist region sign and the driving state of the vehicle does not match the default driving state corresponding to the road sign and/or the tourist region sign, generating an instruction for controlling the vehicle to drive towards a corresponding road according to the vehicle's destination; or in response to that the traffic sign is road construction safety sign and the driving state of the vehicle does not match the default driving state corresponding to the road construction safety sign, generating an instruction for controlling the vehicle to perform one or more operations of slowing down, braking, detouring, retaining the driving state, turning, turning on a turn signal light, or turning on a brake light according to the indication of the traffic sign.

In one or more optional embodiments, when the target object is a traffic light, the environment detection unit 21 is configured to acquire a video stream involving the traffic light based on an image acquisition apparatus disposed on the vehicle; and perform traffic light state detection on at least one image frame of the video stream, to obtain the traffic light state detection result.

Optionally, the traffic light state may include, but not limited to: distinguishing the traffic lights according to the color and/or shape, for example, the traffic lights distinguished by color includes, red light, green light, and yellow light states, and the traffic lights distinguished by shape includes shapes of going straight, turning left, turning right, turning around. To comprehensively perform intelligent control of the vehicle, in addition to the relative position between the lane line and the vehicle, the states of the traffic lights can also be obtained; according to the state of the traffic light, the vehicle is intelligently controlled to further improve the safety performance of the vehicle.

Optionally, the speed determining unit is configured to, in response to the traffic light state detection result meeting the preset driving alert condition, determine whether a speed of the vehicle exceeds a fourth speed threshold.

Optionally, the preset driving alert condition includes that a current driving state of the vehicle does not conform to the traffic light state detection result.

Optionally, the value range of the fourth speed threshold is greater than 40 km per hour.

Optionally, the result control unit is configured to, in response to that after the preset time period expires, the driving state of the vehicle does not match the default driving state corresponding to the traffic light state detection result, generate an instruction for controlling the vehicle to turn on a turn signal light, slow down, brake, and/or turn.

For the working process and the setting mode of any embodiment of the intelligent driving control apparatus provided by the embodiments of the present application, reference may be made to the specific descriptions of the corresponding method embodiment of the present application, and details are not described herein again due to space limitation.

A vehicle provided according to another aspect of the embodiments of the present application includes the intelligent driving control apparatus according to any of the embodiments above.

An electronic device provided according to another aspect of the embodiments of the present application includes a processor, where the processor includes the intelligent driving control apparatus according to any of the embodiments above. Optionally, the electronic device is a vehicle electronic device.

An electronic device provided according to another aspect of the embodiments of the present application includes: a memory configured to store an executable instruction; and a processor, configured to communicate with the memory to execute the executable instructions so as to complete the operation of the intelligent driving control method according to any of the embodiments above. Optionally, the electronic device is a vehicle electronic device.

A computer readable storage medium provided according to another aspect of the embodiments of the present application is configured to store computer-readable instructions, when the instructions are executed, the operations of the intelligent driving control method according to any of the embodiments above are executed.

A computer program product provided according to another aspect of the embodiments of the present application includes computer-readable codes, when the computer-readable codes are run in a device, the processor in the device executes the instructions for implementing the intelligent driving control method according to any of the embodiments above.

Figure 3:
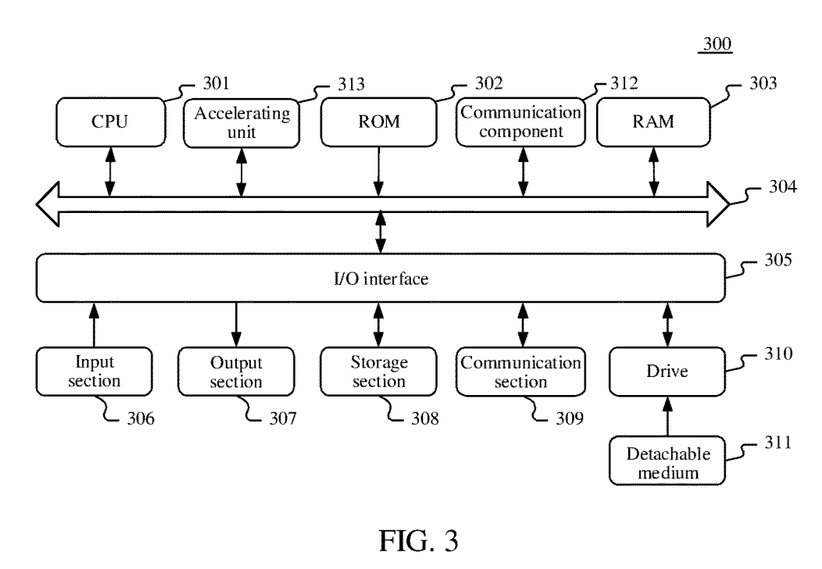
FIG. 3 is a schematic block diagram of an electronic device suitable for use as a terminal device or a server for implementing some embodiments of the present application.

The embodiments of the present application further provide an electronic device which, for example, may be a mobile terminal, a PC, a tablet computer, a server, and the like Referring to FIG. 3 below, a schematic structural diagram of an electronic device 300, which may be a terminal device or a server, suitable for implementing the embodiments of the present application is shown. As shown in FIG. 3, the electronic device 300 includes one or more processors, a communication component, and the like. The one or more processors may include, for example, one or more Central Processing Units (CPUs) 301 and/or one or more dedicated processors 313; the dedicated processors 313 may be used as an acceleration unit 313, and may include, but not limited to, dedicated processors such as an image processor (GPU), FPGA, DSP, other ASIC chips, and the like; the processor may execute appropriate actions and processing according to executable instructions stored in a Read-Only Memory (ROM) 302 or executable instructions loaded from a storage section 308 to a Random Access Memory (RAM) 303. The communication component 312 may include, but be limited to, a network card. The network card may include, but not limited to, an Infiniband (IB) network card.

The processor may communicate with the ROM 302 and/or the RAM 303, to execute executable instructions. The processor is connected to the communication component 312 via a bus 304, and communicates with other target devices via the communication component 312, thereby implementing corresponding operations in any of the methods provided by the embodiments of the present application. For example, the detection result of at least one type of target objects in the driving environment is obtained; whether the detection result meets the preset driving alert condition is determined; in response to the detection result meeting the preset driving alert condition, whether the speed of the vehicle exceeds the speed threshold is determined; in response to the speed exceeding the speed threshold, the driving alert is triggered according to the detection result.

In addition, the RAM 303 may further store various programs and data required for operations of the apparatus.

The CPU 301, the ROM 302, and the RAM 303 are connected to each other by means of the bus 304. In the presence of the RAM 303, the ROM 302 is an optional module. The RAM 303 stores executable instructions, or writes the executable instructions into the ROM 302 when it's running, wherein the executable instructions cause the CPU 301 to execute corresponding operations of the foregoing communication method. An input/output (I/O) interface 305 is also connected to the bus 304. The communication part 312 is integrated or is configured to have multiple sub-modules (for example, multiple IB network cards) connected to the bus.

The following components are connected to the I/O interface 305: an input section 306 including a keyboard, a mouse and the like; an output section 307 including a Cathode-Ray Tube (CRT), a Liquid Crystal Display (LCD), a speaker and the like; the storage section 308 including a hard disk drive and the like; and a communication section 309 of a network interface card including an LAN card, a modem and the like. The communication section 309 performs communication process via a network such as the Internet. A drive 310 is also connected to the I/O interface 305 according to requirements. A removable medium 311 such as a magnetic disk, an optical disk, a magneto-optical disk, a semiconductor memory or the like is mounted on the drive 310 according to requirements, so that a computer program read from the removable medium is installed on the storage section 308 according to requirements.

It should be noted that, the architecture shown in FIG. 3 is merely an optional implementation. During specific implementation, the number and types of the components in FIG. 3 may be selected, decreased, increased, or replaced according to actual requirements. Different functional components may be separated or integrated or the like. For example, the acceleration unit 313 and the CPU 301 may be separated, or the acceleration unit 313 may be integrated on the CPU 301, and the communication component may be separated from or integrated on the CPU 301 or the acceleration unit 313 or the like. These alternative implementations all fall within the scope of protection of the present application.

Particularly, the process described above with reference to the flowchart according to the embodiments of the present application may be implemented as a computer software program. For example, the embodiments of present application include a computer program product. The computer program product includes a computer program tangibly included in a machine-readable medium. The computer program includes a program code for performing a method shown in the flowchart. The program code may include instructions for correspondingly performing steps of the method provided in the embodiments of the present application. For example, the detection result of at least one type of target objects in the driving environment is obtained; whether the detection result meets the preset driving alert condition is determined; in response to the detection result meeting the preset driving alert condition, whether the speed of the vehicle exceeds the speed threshold is determined; in response to the speed exceeding the speed threshold, the driving alert is triggered according to the detection result. In such embodiments, the computer program is downloaded and installed from the network through the communication section 309, and/or is installed from the removable medium 311. The computer program, when being executed by the CPU 301, executes the operations of the foregoing functions defined in the methods of the present application.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses of the present disclosure are implemented in many manners. For example, the methods and apparatuses of the present disclosure are implemented with software, hardware, firmware, or any combination of software, hardware, and firmware. The foregoing specific sequence of steps of the method is merely for description, and unless otherwise stated particularly, is not intended to limit the steps of the method in the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to persons of ordinary skill in the art. The embodiments are selected and described to better describe a principle and an actual application of the present disclosure, and to make a person of ordinary skill in the art understand the present disclosure, so as to design various embodiments with various modifications applicable to particular use.

What is claimed is:

1. An intelligent driving control method, comprising:
    detecting a driving environment of a vehicle to obtain a detection result of at least one type of target objects in the driving environment;
    determining whether the detection result meets a preset driving alert condition;
    in response to the detection result meeting the preset driving alert condition, determining whether a speed of the vehicle exceeds a speed threshold; and
    in response to the speed exceeding the speed threshold, triggering a driving alert according to the detection result; wherein
        when the detection result in the driving environment comprises a detection result of multiple types of target objects that respectively correspond to at least two different speed thresholds, a lower speed threshold of the at least two different speed thresholds is set as the speed threshold corresponding to a current driving environment.

2. The method according to claim 1, wherein
    the speed threshold is defaulted, or the speed threshold is set according to a received instruction; and/or
    for the at least one type of target objects, speed thresholds respectively corresponding to different types of the target objects are same or different; and/or, preset driving alert conditions respectively corresponding to the different types of the target objects are same or different; and/or, driving alert modes respectively corresponding to the different types of the target objects are same or different; and/or,
    the at least one type of target objects comprise at least one of: lane lines, traffic signs, traffic lights, pedestrians, motor vehicles, non-motor vehicles, animals, dangerous objects, or fixed obstacles; and/or, a mode of the driving alert comprises at least one of: an auditory alert mode, a visual alert mode, a tactile alert mode, or an olfactory alert mode; and/or, the detection result in the driving environment comprises one or more of: a detection result of deviation from a lane line, a traffic sign detection result, a traffic light state detection result, and a detection result of a distance from a first object; and the first object comprises at least one of: a pedestrian, a motor vehicle, a non-motor vehicle, an animal, a dangerous object, or a fixed obstacle.

3. The method according to claim 1, further comprising:

in response to the triggering of the driving alert, obtaining a driving state of the vehicle during a preset time period; and in response to that, after the preset time period expires, the driving state of the vehicle does not match a default driving state corresponding to the detection result, generating a driving control instruction for the vehicle according to the default driving state corresponding to the detection result; and/or, in response to the triggering of the driving alert, obtaining a variation trend of the detection result over a preset time period; and in response to that the variation trend of the detection result indicates a danger level being kept or rising and that a duration of the alert exceeds a preset threshold, generating a driving control instruction for the vehicle according to the default driving state corresponding to the detection result.

4. The method according to claim 3, wherein, when the target object is a lane line, the detecting of the driving environment of the vehicle to obtain the detection result of the at least one type of target objects in the driving environment comprises:

acquiring a video stream involving a driving road based on an image acquisition apparatus disposed on the vehicle;

detecting the lane line from at least one image frame of the video stream to obtain a detection result of the lane line; and obtaining a detection result of deviation from the lane line based on the detection result of the lane line and a relative position of the vehicle.

5. The method according to claim 4, wherein, when the target object is an first object, the detecting of the driving environment of the vehicle to obtain the detection result of the at least one type of target objects in the driving environment comprises:

acquiring a video stream involving the first object based on an image acquisition apparatus disposed on the vehicle;

detecting the first object from at least one image frame of the video stream to obtain a detection result of the first object; and obtaining a detection result of a distance from the first object based on the detection result of the first object and a relative position of the vehicle.

6. The method according to claim 5, wherein, when the target object is a traffic sign, the detecting of the driving environment of the vehicle to obtain the detection result of the at least one type of target objects in the driving environment comprises:

acquiring a video stream involving the traffic sign based on an image acquisition device disposed on the vehicle;

classifying the traffic sign in at least one image frame of the video stream to obtain a classification result of the traffic sign; and obtaining a detection result of the traffic sign according to the classification result of the traffic sign.

7. The method according to claim 6, wherein, when the target object is a traffic light, the detecting of the driving environment of the vehicle to obtain the detection result of the at least one type of target objects in the driving environment comprises:

acquiring a video stream involving the traffic light based on an image acquisition apparatus disposed on the vehicle; and performing traffic light state detection on at least one image frame of the video stream to obtain a traffic light state detection result.

8. The method according to claim 7, wherein the determining of whether the speed of the vehicle exceeds the speed threshold comprises:

in response to the detection result of deviation from the lane line meeting the preset driving alert condition, determining whether the speed of the vehicle exceeds a first speed threshold;

and/or, the obtaining of the variation trend of the detection result over the preset time period comprises:

in response to the triggering of the driving alert, obtaining a variation trend of deviation of the vehicle from the lane line over the preset time period, and the generating of the driving control instruction for the vehicle according to the default driving state corresponding to the detection result comprises:

in response to that the variation trend of the deviation of the vehicle from the lane line indicates a level of the deviation from the lane line rising and that the duration of the alert exceeds the preset threshold, issuing a prompt information for turning on a turn signal light and/or controlling the vehicle to turn on a corresponding turn signal light according to the default driving state corresponding to the detection result of the deviation from the lane line;

and/or, the obtaining of the variation trend of the detection result over the preset time period comprises:

in response to the triggering of the driving alert, obtaining a variation range of a distance between the vehicle and the lane line, and the generating of the driving control instruction for the vehicle according to the default driving state corresponding to the detection result comprises:

in response to that the variation range exceeds a safe distance range during a period corresponding to the preset threshold for the duration of the alert, controlling the vehicle so that the distance between the vehicle and the lane line is kept within the safe distance range.

9. The method according to claim 8, wherein the preset driving alert condition comprises that a distance between the vehicle and the lane line is within a preset range; and/or, the first speed threshold is greater than 35 kilometers per hour; and/or, the first speed threshold is in a range of 60~80 kilometers per hour.

10. The method according to claim 8, wherein the issuing of the prompt information for turning on the turn signal light and/or the controlling of the vehicle to turn on the corresponding turn signal light according to the default driving state corresponding to the detection result of the deviation from the lane line comprises:
- in response to that the variation trend of the deviation of the vehicle from the lane line indicates the level of the deviation from the lane line rising and that the duration of the alert exceeds the preset threshold, determining, based on at least one of the traffic sign detection result, the traffic light state detection result, or the detection result of the distance from the first object, to issue the prompt information for turning on the turn signal light and/or to control the vehicle to turn on the corresponding turn signal light.

11. The method according to claim 8, wherein the obtaining of the driving state of the vehicle during the preset time period comprises:
- in response to the triggering of the driving alert, obtaining a turn signal light state of the vehicle, and
- the generating of the driving control instruction for the vehicle according to the default driving state corresponding to the detection result comprises:
- in response to that, after the preset time period expires, the turn signal light state matches the default driving state corresponding to the detection result, not issuing the prompt information and/or control information; and/or
- in response to that, after the preset time period expires, the turn signal light state does not match the default driving state corresponding to the detection result, issuing the prompt information and/or control information;

and/or,
- the default driving state corresponding to the detection result is determined based on the relative position and a type of the lane line; and
- the type of the lane line comprises at least one of white dotted line, white solid line, yellow dotted line, yellow solid line, double white dotted lines, double yellow solid lines, yellow dotted and solid lines, or double white solid lines;

and/or,
- the determining of whether the speed of the vehicle exceeds the speed threshold comprises:
- in response to the detection result of the distance from the first object meeting the preset driving alert condition, determining whether the speed of the vehicle exceeds a second speed threshold.

12. The method according to claim 8, wherein,
- for different types of the first objects, the second speed threshold has different value ranges or a same value range; and/or,
- when the first object is a motor vehicle, the second speed threshold is in a range of 20~200 kilometers per hour; and/or,
- when the first object is a pedestrian, the second speed threshold is in a range of 20~40 kilometers per hour; and/or,
- the default driving state corresponding to the detection result of the first object is determined based on a time-to-collision of the vehicle with respect to the first object; and
- the time-to-collision is determined based on the distance from the first object and a relative speed of the vehicle with respect to the first object.

13. The method according to claim 12, wherein the obtaining of the variation trend of the detection result over the preset time period comprises:
- in response to the triggering of the driving alert, determining whether the time-to-collision meets, within the preset time period, at least one of following conditions: the time-to-collision is less than a first preset time, the time-to-collision is less than a second preset time, or the time-to-collision is less than a third preset time; and
- the generating of the driving control instruction for the vehicle according to the default driving state corresponding to the detection result comprises:
- in response to that a variation trend of the detection result of the first object indicates the time-to-collision reducing and that the duration of the alert exceeds the preset threshold, generating a preset anti-collision instruction according to the default driving state corresponding to the detection result, wherein the preset anti-collision instruction comprises at least one of: an instruction for prompting a driver to reduce the speed, an instruction for controlling the vehicle to reduce the speed, or an instruction for controlling a part or all of braking and/or turning functions of the vehicle.

14. The method according to claim 13, wherein the generating of the preset anti-collision instruction according to the default driving state corresponding to the detection result comprises:
- in response to the time-to-collision being less than the first preset time and the duration of the alert exceeding the preset threshold, issuing alert information to prompt the driver to reduce the speed and/or to turn; and/or
- in response to the time-to-collision being less than the second preset time and the duration of the alert exceeding the preset threshold, issuing the alert information to prompt the driver to reduce the speed and/or to turn, and controlling a part of braking and/or turning functions of the vehicle; and/or
- in response to the time-to-collision being less than the third preset time and the duration of the alert exceeding the preset threshold, controlling the vehicle to brake and/or to turn.

15. The method according to claim 14, wherein
- respective value ranges of the first preset time, the second preset time, and the third preset time have an intersection therebetween or have no intersection therebetween; and/or,
- the first preset time is in a range of 1.5~5 seconds, and/or the second preset time is in a range of 1~2 seconds, and/or the third preset time is less than or equal to 1 second.

16. The method according to claim 15, wherein the determining of whether the speed of the vehicle exceeds the speed threshold comprises:
- in response to the detection result of the traffic sign meeting the preset driving alert condition, determining whether the speed of the vehicle exceeds a third speed threshold;

and/or,
- the determining of whether the speed of the vehicle exceeds the speed threshold comprises:
- in response to the traffic light state detection result meeting the preset driving alert condition, determining whether the speed of the vehicle exceeds a fourth speed threshold;

and/or,
- the generating of the driving control instruction for the vehicle according to the default driving state corresponding to the detection result comprises:
- in response to that, after the preset time period expires, the driving state of the vehicle does not match the default driving state corresponding to the traffic light state detection result, generating an instruction for controlling the vehicle to turn on a turn signal light, slow down, brake, and/or turn.

17. The method according to claim 16, wherein
the third speed threshold is greater than 60 kilometers per hour; and/or,
the generating of the driving control instruction for the vehicle according to the default driving state corresponding to the detection result comprises at least one of:
in response to that the traffic sign is a speed limit sign and that the driving state of the vehicle does not match the default driving state corresponding to the speed limit sign, generating an instruction for controlling the speed of the vehicle to increase or decrease to a speed corresponding to the traffic sign;
in response to that the traffic sign is a prohibition sign and that the driving state of the vehicle does not match the default driving state corresponding to the prohibition sign, issuing an instruction for controlling the vehicle not to perform an operation prohibited by the traffic sign;
in response to that the traffic sign is a warning sign and that the driving state of the vehicle does not match the default driving state corresponding to the warning sign, generating an instruction for controlling the vehicle to change the driving state;
in response to that the traffic sign is an indication sign and that the driving state of the vehicle does not match the default driving state corresponding to the indication sign, generating an instruction for controlling the vehicle to perform driving control according to indication of the traffic sign;
in response to that the traffic sign is a road sign and/or a tourist region sign and that the driving state of the vehicle does not match the default driving state corresponding to the road sign and/or the tourist region sign, generating an instruction for controlling the vehicle to drive towards a road according to the vehicle's destination; or
in response to that the traffic sign is a road construction safety sign and that the driving state of the vehicle does not match the default driving state corresponding to the road construction safety sign, generating an instruction for controlling the vehicle to perform one or more operations of slowing down, braking, detouring, retaining the driving state, turning, turning on a turn signal light, or turning on a brake light according to indication of the traffic sign.

18. The method according to claim 17, wherein
the preset driving alert condition comprises that a current driving state of the vehicle does not conform to the traffic light state detection result; and/or,
the fourth speed threshold is greater than 40 kilometers per hour.

19. An electronic device, comprising: a memory storing executable instructions; and
a processor, configured to communicate with the memory to execute the executable instructions to implement operations comprising:
detecting a driving environment of a vehicle to obtain a detection result of at least one type of target objects in the driving environment;
determining whether the detection result meets a preset driving alert condition;
in response to the detection result meeting the preset driving alert condition, determining whether a speed of the vehicle exceeds a speed threshold; and
in response to the speed exceeding the speed threshold, triggering a driving alert according to the detection result: wherein
when the detection result in the driving environment comprises a detection result of multiple types of target objects that respectively correspond to at least two different speed thresholds, a lower speed threshold of the at least two different speed thresholds is set as the speed threshold corresponding to a current driving environment.

20. A non-transitory computer-readable storage medium, having a computer program stored thereon, wherein when the program is executed by a processor, the processor is caused to perform operations comprising:
detecting a driving environment of a vehicle to obtain a detection result of at least one type of target objects in the driving environment;
determining whether the detection result meets a preset driving alert condition;
in response to the detection result meeting the preset driving alert condition, determining whether a speed of the vehicle exceeds a speed threshold; and
in response to the speed exceeding the speed threshold, triggering a driving alert according to the detection result; wherein
when the detection result in the driving environment comprises a detection result of multiple types of target objects that respectively correspond to at least two different speed thresholds, a lower speed threshold of the at least two different speed thresholds is set as the speed threshold corresponding to a current driving environment.

\* \* \* \* \*